(12) United States Patent
Luo

(10) Patent No.: US 10,085,152 B2
(45) Date of Patent: Sep. 25, 2018

(54) DATA PROCESSING METHOD, DATA PROCESSING APPARATUS AND TERMINAL

(71) Applicant: Yulong Computer Telecommunication Scientific (Shenzhen) Co., Ltd., Shenzhen, Guangdong (CN)

(72) Inventor: Limin Luo, Guangdong (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/468,662

(22) Filed: Mar. 24, 2017

(65) Prior Publication Data
US 2017/0201877 A1  Jul. 13, 2017

Related U.S. Application Data

(63) Continuation-in-part of application No. PCT/CN2014/090105, filed on Oct. 31, 2014.

(30) Foreign Application Priority Data

Sep. 28, 2014 (CN) .......................... 2014 1 0507842

(51) Int. Cl.
*H04W 12/08* (2009.01)
*G06F 3/06* (2006.01)
*H04W 8/18* (2009.01)

(52) U.S. Cl.
CPC ............ *H04W 12/08* (2013.01); *G06F 3/062* (2013.01); *G06F 3/065* (2013.01); *G06F 3/0619* (2013.01);
(Continued)

(58) Field of Classification Search
CPC ..... H04W 9/183; H04W 12/08; H04W 8/183; G06F 3/0619; G06F 3/065; G06F 3/0679; G06F 3/0622; G06F 3/0623
See application file for complete search history.

(56) References Cited

U.S. PATENT DOCUMENTS 7,159,243 B1 *  1/2007  Muhlberger ......... G06Q 20/341
                                                    380/28
2010/0135492 A1   6/2010  Jia
(Continued)

FOREIGN PATENT DOCUMENTS

CN         1869931 A      11/2006
CN       101615123 A      12/2009
(Continued)

*Primary Examiner* — Magdi Elhag
(74) *Attorney, Agent, or Firm* — Bayes PLLC

(57) ABSTRACT

The present invention provides a data processing method, which is used for a terminal comprising a plurality of operating systems, and the method comprises: determining a first operating system currently used by the terminal when a command to store data in a Subscriber Identity Module (SIM) card in the terminal is received; storing the data in a first storage area of the SIM card when the first operating system currently in use is a designated operating system amongst the plurality of operating systems of the terminal, and storing the data in a second storage area of the SIM card when the first operating system currently in use is a non-designated operating system amongst the plurality of operating systems of the terminal. Correspondingly, the present invention also provides a data processing apparatus and a terminal.

18 Claims, 4 Drawing Sheets

(52) U.S. Cl.
CPC .......... *G06F 3/0622* (2013.01); *G06F 3/0623* (2013.01); *G06F 3/0679* (2013.01); *H04W 8/183* (2013.01)

(56) References Cited

U.S. PATENT DOCUMENTS

| | | | |
|---|---|---|---|
| 2014/0149799 A1* | 5/2014 | Buendgen | G06F 11/0778 |
| | | | 714/38.11 |
| 2015/0220709 A1* | 8/2015 | Jung | G06F 21/45 |
| | | | 713/155 |
| 2016/0196432 A1* | 7/2016 | Main | G06F 8/61 |
| | | | 726/1 |

FOREIGN PATENT DOCUMENTS

| | | | |
|---|---|---|---|
| CN | 102263846 A | * | 11/2011 |
| CN | 103544114 A | | 1/2014 |

* cited by examiner

DATA PROCESSING METHOD, DATA PROCESSING APPARATUS AND TERMINAL

CROSS-REFERENCE TO RELATED APPLICATIONS

This application is a continuation-in-part application of International Application No. PCT/CN2014/090105 filed Oct. 31, 2014, which application claims priority to Chinese Application No. 201410507842.6 filed Sep. 28, 2014, all of which are incorporated by reference in their entirety.

FIELD OF THE INVENTION

The present invention relates to the technical field of data storage, and specifically to a data processing method, a data processing apparatus and a terminal.

BACKGROUND OF THE INVENTION

At present, mobile phone terminals provide no special security protection for key information on Subscriber Identity Module (SIM) cards, such as contacts, short messages, and the like; instead, those key information is just directly stored in the internal memories of the SIM cards. Data storage in the existing SIM card has the defect that no security classification is made for contacts in the card and all the contacts and short messages in the card are visible for all the users.

Therefore, there is a need for a new technical solution which may allow security classification for an SIM card so as to guarantee the security of data stored in the SIM card.

SUMMARY OF THE INVENTION

Exactly based on the above problem, the present invention provides a new technical solution which may allow security classification for an SIM card so as to guarantee the security of data stored in the SIM card.

To this end, the present invention provides a data processing method, which is used for a terminal comprising a plurality of operating systems, and the method comprises:

determining a first operating system currently used by the terminal when a command to store data in a Subscriber Identity Module (SIM) card in the terminal is received; storing the data in a first storage area of the SIM card when the first operating system currently in use is a designated operating system amongst the plurality of operating systems of the terminal, and storing the data in a second storage area of the SIM card when the first operating system currently in use is a non-designated operating system amongst the plurality of operating systems of the terminal.

In this technical solution, the specific storage location of the data stored in the SIM card may be determined in the SIM card according to the operating system currently used by the terminal. For instance, when the operating system is the designated operating system, the data is stored in one storage area of the SIM card; when the operating system is the non-designated operating system, the data is stored in another storage area. Specifically, the storage area may be designated as the operating system having the highest security level in the terminal, or may be a certain operating system designated by a user, for instance, a security system in an existing dual-system terminal. For example, when the terminal operates with a general system, the data required to be stored is stored in a general storage area of the SIM card as general information; when the terminal operates with the security system, the data required to be stored is stored in a security storage area of the SIM card as security information. In this way, security classification is made for the data in the SIM card to distinguish the general information from the security information, so that the security of the data can be guaranteed and privacy information of users can be protected.

In the above technical solution, preferably, the method also comprises: judging whether the first storage area exists in the SIM card when the first operating system currently in use is the designated operating system; and creating the first storage area in the SIM card when the first storage area does not exist in the SIM card.

In this technical solution, if the first storage area already exists in the SIM card, the data stored when the designated operating system is determined may be directly stored in the first storage area. However, when no first storage area exists in the SIM card, the first storage area needs to be created according to preset parameters for the first storage area, wherein the data of the first storage area includes parameters such as the capacity of the storage area and the like.

In the above technical solution, preferably, the method also comprises: when storing the data in the first storage area of the SIM card, generating keys according to identification information of the terminal and storing the keys in the designated operating system and the first storage area of the SIM card, respectively.

In the above technical solution, preferably, a second operating system currently used by the terminal is determined when a read command to the SIM card is received; only the second operating system currently in use is allowed to read second data in the second storage area of the SIM card when the second operating system currently in use is the non-designated operating system; a detection is made on whether the first storage area exists in the SIM card when the second operating system currently in use is the designated operating system; a judgment is made on whether the key stored in the second operating system currently in use matches with the key stored in the first storage area when the judgment result is that the first storage area exists in the SIM card; the second operating system currently in use is allowed to read first data in the first storage area when the judgment result is matching; otherwise, the second operating system currently in use is not allowed to read the first data in the first storage area.

When the data is stored in the first storage area, the keys are generated according to the identification information of the terminal, for example, such information as International Mobile Equipment Identity (IMEI), International Mobile Subscriber Identification (IMSI), and Mobile Equipment Identifier (MEID), and then stored in the designated operating system of the terminal and the first storage area of the SIM card, respectively. Thus, when any terminal intends to read the data in the first storage area of the SIM card, the terminal is required to match the key stored in itself with the key stored in the SIM card; if the two match with each other, the terminal is allowed to read the data in the first storage area; and if not, it is only allowed to read the data in the second storage area. In this way, if a user stores data in the first storage area of the SIM card by using the designated operating system of the user's own terminal, other operating systems of the terminal and the operating systems of other terminals all cannot read the contents in the first storage area of the SIM card. As a result, information security of the user is guaranteed and the user experience is improved.

In the above technical solution, preferably, the method also comprises: encrypting the first data in the first storage area by using the key generated by the designated operating system; and decrypting the first data in the first storage area by using the key stored in the first storage area when the judgment result is matching.

In this technical solution, the stored data may also be encrypted in order to further guarantee the security of the data. In this way, when terminals intend to read the stored data, only the operating systems of those terminals capable of decryption can read the data. Therefore, the security of the data is further guaranteed.

In the above technical solution, preferably, the method also comprises: setting up in the SIM card according to a received setup command the first storage area and the second storage area as well as respective capacities of the first storage area and the second storage area.

In this technical solution, users or manufacturers may set up different storage areas in SIM cards and the capacity of each storage area according to personal requirements; thus, different requirements of different users or different manufacturers are met and the user experience is improved.

According to another aspect of the present invention, also provided is a data processing apparatus, which is used for a terminal comprising a plurality of operating systems and comprises: a determination unit configured to determine a first operating system currently used by the terminal when a command to store data in a subscriber identity module (SIM) card in the terminal is received; and a storage unit configured to store the data in a first storage area of the SIM card when the first operating system currently in use is a designated operating system amongst the plurality of operating systems of the terminal, and store the data in a second storage area of the SIM card when the first operating system currently in use is a non-designated operating system amongst the plurality of operating systems of the terminal.

In this technical solution, the specific storage location of the data stored in the SIM card may be determined in the SIM card according to the operating system currently used by the terminal. For instance, when the operating system is the designated operating system, the data is stored in one storage area of the SIM card; when the operating system is the non-designated operating system, the data is stored in another storage area. Specifically, the storage area may be designated as the operating system having the highest security level in the terminal, or may be a certain operating system designated by a user, for instance, a security system in an existing dual-system terminal. For example, when the terminal operates with a general system, the data required to be stored is stored in a general storage area of the SIM card as general information; when the terminal operates with the security system, the data required to be stored is stored in a security storage area of the SIM card as security information. In this way, security classification is made for the data in the SIM card to distinguish the general information from the security information, so that the security of the data can be guaranteed and privacy information of users can be protected.

In the above technical solution, preferably, the apparatus also comprises: a judgment unit configured to judge whether the first storage area exists in the SIM card when the first operating system currently in use is the designated operating system; and a creation unit configured to create the first storage area in the SIM card when the first storage area does not exist in the SIM card.

In this technical solution, if the first storage area already exists in the SIM card, the data stored when the operating system is designated may be directly stored in the first storage area. However, when no first storage area exists in the SIM card, the first storage area needs to be created according to preset parameters for the first storage area, wherein the data of the first storage area includes parameters such as the capacity of the storage area and the like.

In the above technical solution, preferably, the apparatus also comprises: a key storage unit configured to, when storing the data in the first storage area of the SIM card, generate keys according to identification information of the terminal and store the keys in the designated operating system and the first storage area of the SIM card, respectively.

In the above technical solution, preferably, the determination unit is also configured to: determine a second operating system currently used by the terminal when a read command to the SIM card is received; the apparatus also comprises: a processing unit configured to allow only the second operating system currently in use to read second data in the second storage area of the SIM card when the second operating system currently in use is the non-designated operating system; a detection unit configured to detect whether the first storage area exists in the SIM card when the second operating system currently in use is the designated operating system; and a matching unit configured to judge whether the key stored in the second operating system currently in use matches with the key stored in the first storage area when the judgment result is that the first storage area exists in the SIM card; and the processing unit is also configured to: allow the second operating system currently in use to read first data in the first storage area when the judgment result is matching or otherwise not allow the second operating system currently in use to read the first data in the first storage area.

When the data is stored in the first storage area, the keys are generated according to the identification information of the terminal, (such information as IMEI, IMSI, and MEID), and then stored in the designated operating system of the terminal and the first storage area of the SIM card, respectively. Thus, when any terminal intends to read the data in the first storage area of the SIM card, the terminal is required to match the key stored in itself with the key stored in the SIM card; if the two match with each other, the terminal is allowed to read the data in the first storage area; and if not, it is only allowed to read the data in the second storage area. In this way, if a user stores data in the first storage area of the SIM card by using the designated operating system of the user's own terminal, other operating systems of the terminal and the operating systems of other terminals all cannot read the contents in the first storage area of the SIM card. As a result, information security of the user is guaranteed and the user experience is improved.

In the above technical solution, preferably, the apparatus also comprises: an encryption unit configured to encrypt the first data in the first storage area by using the key generated by the designated operating system; and a decryption unit configured to decrypt the first data in the first storage area by using the key stored in the first storage area when the judgment result is matching.

In this technical solution, the stored data may also be encrypted in order to further guarantee the security of the data. In this way, when terminals intend to read the stored data, only the operating systems of those terminals capable of decryption can read the data. Therefore, the security of the data is further guaranteed.

In the above technical solution, preferably, the apparatus also comprises: a setup unit configured to set up in the SIM card according to a received setup command the first storage area and the second storage area as well as respective capacities of the first storage area and the second storage area.

In this technical solution, users or manufacturers may set up different storage areas in SIM cards and the capacity of each storage area according to personal requirements; thus, different requirements of different users or different manufacturers are met and the user experience is improved.

According to yet another aspect of the present invention, also provided is a terminal comprising a plurality of operating systems, a memory and a processor, wherein by invoking operation instructions stored in the memory, the processor is used for executing the following operations: determining a first operating system currently used by the terminal when a command to store data in a Subscriber Identity Module (SIM) card in the terminal is received; storing the data in a first storage area of the SIM card when the first operating system currently in use is a designated operating system amongst the plurality of operating systems of the terminal, and storing the data in a second storage area of the SIM card when the first operating system currently in use is a non-designated operating system amongst the plurality of operating systems of the terminal.

In this technical solution, the specific storage location of the data stored in the SIM card may be determined in the SIM card according to the operating system currently used by the terminal. For instance, when the operating system is the designated operating system, the data is stored in one storage area of the SIM card; when the operating system is the non-designated operating system, the data is stored in another storage area. Specifically, the storage area may be designated as the operating system having the highest security level in the terminal, or may be a certain operating system designated by a user, for instance, a security system in an existing dual-system terminal. For example, when the terminal operates with a general system, the data required to be stored is stored in a general storage area of the SIM card as general information; when the terminal operates with the security system, the data required to be stored is stored in a security storage area of the SIM card as security information. In this way, security classification is made for the data in the SIM card to distinguish the general information from the security information, so that the security of the data can be guaranteed and privacy information of users can be protected.

In the above technical solution, preferably, by invoking the operation instructions stored in the memory, the processor is further used for executing the following operations: judging whether the first storage area exists in the SIM card when the first operating system currently in use is the designated operating system; and creating the first storage area in the SIM card when the first storage area does not exist in the SIM card.

In this technical solution, if the first storage area already exists in the SIM card, the data stored when the designated operating system is determined may be directly stored in the first storage area. However, when no first storage area exists in the SIM card, the first storage area needs to be created according to preset parameters for the first storage area, wherein the data of the first storage area includes parameters such as the capacity of the storage area and the like.

In the above technical solution, preferably, by invoking the operation instructions stored in the memory, the processor is further used for executing the following operations: when storing the data in the first storage area of the SIM card, generating keys according to identification information of the terminal and storing the keys in the designated operating system and the first storage area of the SIM card, respectively.

In the above technical solution, preferably, by invoking the operation instructions stored in the memory, the processor is further used for executing the following operations: determining a second operating system currently used by the terminal when a read command to the SIM card is received; allowing only the second operating system currently in use to read second data in the second storage area of the SIM card when the second operating system currently in use is the non-designated operating system; detecting whether the first storage area exists in the SIM card when the second operating system currently in use is the designated operating system; judging whether the key stored in the second operating system currently in use matches with the key stored in the first storage area when the judgment result is that the first storage area exists in the SIM card; allowing the second operating system currently in use to read first data in the first storage area when the judgment result is matching; otherwise, not allowing the second operating system currently in use to read the first data in the first storage area.

When the data is stored in the first storage area, the keys are generated according to the identification information of the terminal, for example, such information as International Mobile Equipment Identity (IMEI), International Mobile Subscriber Identification (IMSI), and Mobile Equipment Identifier (MEID), and then stored in the designated operating system of the terminal and the first storage area of the SIM card, respectively. Thus, when any terminal intends to read the data in the first storage area of the SIM card, the terminal is required to match the key stored in itself with the key stored in the SIM card; if the two match with each other, the terminal is allowed to read the data in the first storage area; and if not, it is only allowed to read the data in the second storage area. In this way, if a user stores data in the first storage area of the SIM card by using the designated operating system of the user's own terminal, other operating systems of the terminal and the operating systems of other terminals all cannot read the contents in the first storage area of the SIM card. As a result, information security of the user is guaranteed and the user experience is improved.

In the above technical solution, preferably, by invoking the operation instructions stored in the memory, the processor is further used for executing the following operations: encrypting the first data in the first storage area by using the key generated by the designated operating system; and decrypting the first data in the first storage area by using the key stored in the first storage area when the judgment result is matching.

In this technical solution, the stored data may also be encrypted in order to further guarantee the security of the data. In this way, when terminals intend to read the stored data, only the operating systems of those terminals capable of decryption can read the data. Therefore, the security of the data is further guaranteed.

In the above technical solution, preferably, by invoking the operation instructions stored in the memory, the processor is further used for executing the following operations: setting up in the SIM card according to a received setup command the first storage area and the second storage area as well as respective capacities of the first storage area and the second storage area.

In this technical solution, users or manufacturers may set up different storage areas in SIM cards and the capacity of each storage area according to personal requirements; thus, different requirements of different users or different manufacturers are met and the user experience is improved.

By means of the above technical solution, a user can set up a security storage area of the SIM card according to personal requirements, such that other operating systems and other terminals cannot access the security data in the security storage area; thus, privacy information of the user is protected and the user experience is improved.

DETAILED DESCRIPTION OF THE EMBODIMENTS

In order to provide clearer understanding of the above objectives, features and advantages of the present invention, the present invention will be further described in detail below by combining the accompanying drawings with specific embodiments. It needs to be noted that the embodiments of the present application and features in the embodiments can be combined with one another without conflict.

Numerous specific details are set forth in the following descriptions so as to provide adequate understanding of the present invention; however, the present invention may also be implemented in other modes than those described herein. Therefore, the protection scope of the present invention is not limited by the specific embodiments disclosed below.

Figure 1:
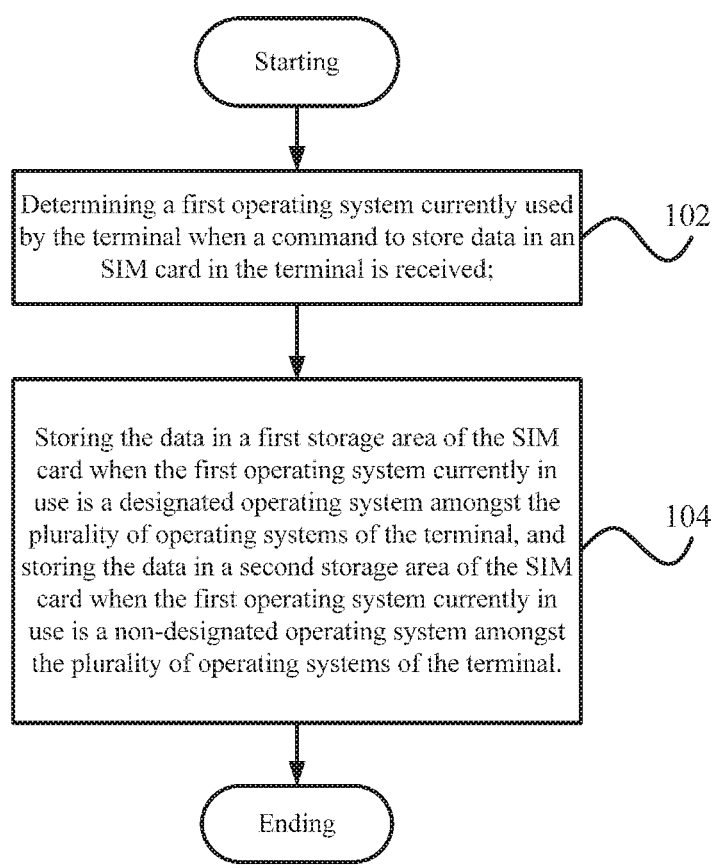
FIG. 1 shows a flow diagram of a data processing method according to an embodiment of the present invention.

FIG. 1 shows the flow diagram of a data processing method according to an embodiment of the present invention.

As shown in FIG. 1, the data processing method according to the embodiment of the present invention comprises: step 102, determining a first operating system currently used by the terminal when a command to store data in a subscriber identity module (SIM) card in the terminal is received; and step S104, storing the data in a first storage area of the SIM card when the first operating system currently in use is a designated operating system amongst the plurality of operating systems of the terminal, and storing the data in a second storage area of the SIM card when the first operating system currently in use is a non-designated operating system amongst the plurality of operating systems of the terminal.

In this technical solution, the specific storage location of the data stored in the SIM card may be determined in the SIM card according to the operating system currently used by the terminal. For instance, when the operating system is the designated operating system, the data is stored in one storage area of the SIM card; when the operating system is the non-designated operating system, the data is stored in another storage area. Specifically, the storage area may be designated as the operating system having the highest security level in the terminal, or may be a certain operating system designated by a user, for instance, a security system in an existing dual-system terminal. For example, when the terminal operates with a general system, the data required to be stored is stored in a general storage area of the SIM card as general information; when the terminal operates with the security system, the data required to be stored is stored in a security storage area of the SIM card as security information. In this way, security classification is made for the data in the SIM card to distinguish the general information from the security information, so that the security of the data can be guaranteed and privacy information of users can be protected.

In the above technical solution, preferably, the method also comprises: judging whether the first storage area exists in the SIM card when the first operating system currently in use is the designated operating system; and creating the first storage area in the SIM card when the first storage area does not exist in the SIM card.

In this technical solution, if the first storage area already exists in the SIM card, the data stored when the operating system is designated may be directly stored in the first storage area. However, when no first storage area exists in the SIM card, the first storage area needs to be created according to preset parameters for the first storage area, wherein the data of the first storage area includes parameters such as the capacity of the storage area and the like.

In the above technical solution, preferably, the method also comprises: when storing the data in the first storage area of the SIM card, generating keys according to identification information of the terminal and storing the keys in the designated operating system and the first storage area of the SIM card, respectively.

In the above technical solution, preferably, a second operating system currently used by the terminal is determined when a read command to the SIM card is received; only the second operating system currently in use is allowed to read second data in the second storage area of the SIM card when the second operating system currently in use is the non-designated operating system; a detection is made on whether the first storage area exists in the SIM card when the second operating system currently in use is the designated operating system; a judgment is made on whether the key stored in the second operating system currently in use matches with the key stored in the first storage area when the judgment result is that the first storage area exists in the SIM card; the second operating system currently in use is allowed to read first data in the first storage area when the judgment result is matching; otherwise, the second operating system currently in use is not allowed to read the first data in the first storage area.

When the data is stored in the first storage area, the keys are generated according to the identification information (such information as IMEI, IMSI, and MEID) of the terminal, and then stored in the designated operating system of the terminal and the first storage area of the SIM card, respectively. Thus, when any terminal intends to read the data in the first storage area of the SIM card, the terminal is required to match the key stored in itself with the key stored in the SIM card; if the two match with each other, the terminal is allowed to read the data in the first storage area; and if not, it is only allowed to read the data in the second storage area. In this way, if a user stores data in the first storage area of the SIM card by using the designated operating system of the user's own terminal, other operating systems of the terminal and the operating systems of other terminals all cannot read the contents in the first storage area of the SIM card. As a result, information security of the user is guaranteed and the user experience is improved.

In the above technical solution, preferably, the apparatus also comprises: the first data in the first storage area is encrypted by using the key generated by the designated operating system; and the first data in the first storage area is decrypted by using the key stored in the first storage area when the judgment result is matching.

In this technical solution, the stored data may also be encrypted in order to further guarantee the security of the data. In this way, when terminals intend to read the stored data, only the operating systems of those terminals capable of decryption can read the data. Therefore, the security of the data is further guaranteed.

In the above technical solution, preferably, the apparatus also comprises: the first storage area and the second storage area as well as respective capacities of the first storage area and the second storage area are set up in the SIM card according to a received setup command.

In this technical solution, users or manufacturers may set up different storage areas in SIM cards and the capacity of each storage area according to personal requirements; thus, different requirements of different users or different manufacturers are met and the user experience is improved.

Figure 2:
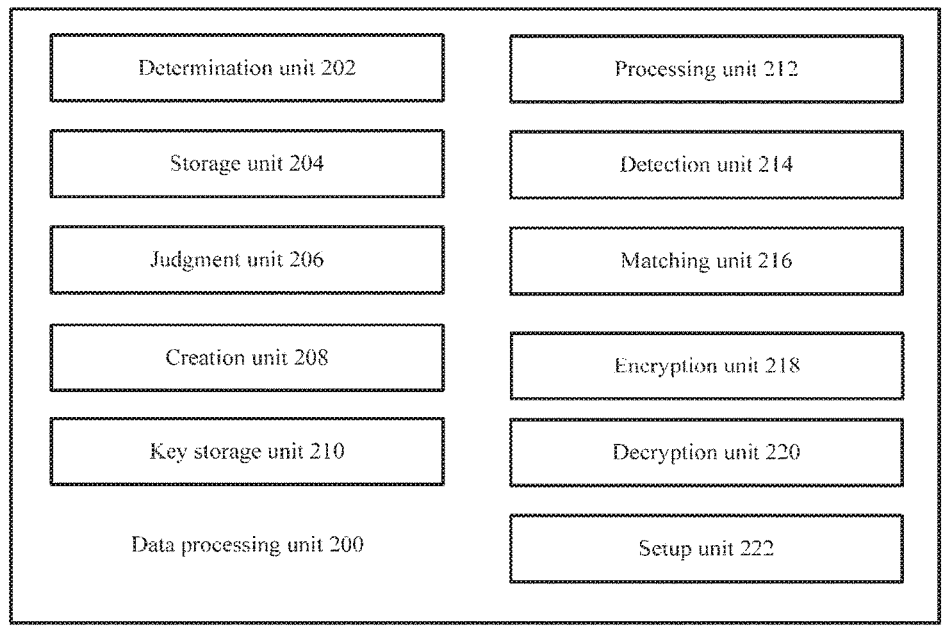
FIG. 2 shows a block diagram of a data processing apparatus according to an embodiment of the present invention.

FIG. 2 shows the block diagram of a data processing apparatus according to an embodiment of the present invention.

As shown in FIG. 2, the data processing apparatus 200 according to the embodiment of the present invention is used for a terminal comprising a plurality of operating systems and comprises: a determination unit 202 configured to determine a first operating system currently used by the terminal when a command to store data in a subscriber identity module (SIM) card in the terminal is received; and a storage unit 204 configured to store the data in a first storage area of the SIM card when the first operating system currently in use is a designated operating system amongst the plurality of operating systems of the terminal, and store the data in a second storage area of the SIM card when the first operating system currently in use is a non-designated operating system amongst the plurality of operating systems of the terminal.

In this technical solution, the specific storage location of the data stored in the SIM card may be determined in the SIM card according to the operating system currently used by the terminal. For instance, when the operating system is the designated operating system, the data is stored in one storage area of the SIM card; when the operating system is the non-designated operating system, the data is stored in another storage area. Specifically, the storage area may be designated as the operating system having the highest security level in the terminal, or may be a certain operating system designated by a user, for instance, a security system in an existing dual-system terminal. For example, when the terminal operates with a general system, the data required to be stored is stored in a general storage area of the SIM card as general information; when the terminal operates with the security system, the data required to be stored is stored in a security storage area of the SIM card as security information. In this way, security classification is made for the data in the SIM card to distinguish the general information from the security information, so that the security of the data can be guaranteed and privacy information of users can be protected.

In the above technical solution, preferably, the apparatus also comprises: a judgment unit 206 configured to judge whether the first storage area exists in the SIM card when the first operating system currently in use is the designated operating system; and a creation unit 208 configured to create the first storage area in the SIM card when the first storage area does not exist in the SIM card.

In this technical solution, if the first storage area already exists in the SIM card, the data stored when the operating system is designated may be directly stored in the first storage area. However, when no first storage area exists in the SIM card, the first storage area needs to be created according to preset parameters for the first storage area, wherein the data of the first storage area includes parameters such as the capacity of the storage area and the like.

In the above technical solution, preferably, the apparatus also comprises: a key storage unit 210 configured to, when storing the data in the first storage area of the SIM card, generate keys according to identification information of the terminal and store the keys in the designated operating system and the first storage area of the SIM card, respectively.

In the above technical solution, preferably, the determination unit 204 is also configured to: determine a second operating system currently used by the terminal when a read command to the SIM card is received; the apparatus also comprises: a processing unit 212 configured to allow only the second operating system currently in use to read second data in the second storage area of the SIM card when the second operating system currently in use is the non-designated operating system; a detection unit 214 configured to detect whether the first storage area exists in the SIM card when the second operating system currently in use is the designated operating system; and a matching unit 216 configured to judge whether the key stored in the second operating system currently in use matches with the key stored in the first storage area when the judgment result is that the first storage area exists in the SIM card; and the processing unit 212 is also configured to: allow the second operating system currently in use to read first data in the first storage area when the judgment result is matching or otherwise not allow the second operating system currently in use to read the first data in the first storage area.

When the data is stored in the first storage area, the keys are generated according to the identification information (such information as IMEI, IMSI, and MEID) of the terminal, and then stored in the designated operating system of the terminal and the first storage area of the SIM card, respectively. Thus, when any terminal intends to read the data in the first storage area of the SIM card, the terminal is required to match the key stored in itself with the key stored in the SIM card; if the two match with each other, the terminal is allowed to read the data in the first storage area; and if not, it is only allowed to read the data in the second storage area. In this way, if a user stores data in the first storage area of the SIM card by using the designated operating system of the user's own terminal, other operating systems of the terminal and the operating systems of other terminals all cannot read the contents in the first storage area of the SIM card. As a result, information security of the user is guaranteed and the user experience is improved.

In the above technical solution, preferably, the apparatus also comprises: an encryption unit 218 configured to encrypt the first data in the first storage area by using the key generated by the designated operating system; and a decryption unit 220 configured to decrypt the first data in the first storage area by using the key stored in the first storage area when the judgment result is matching.

In this technical solution, the stored data may also be encrypted in order to further guarantee the security of the data. In this way, when terminals intend to read the stored data, only the operating systems of those terminals capable of decryption can read the data. Therefore, the security of the data is further guaranteed.

In the above technical solution, preferably, the apparatus also comprises: a setup unit 222 configured to set up in the SIM card according to a received setup command the first storage area and the second storage area as well as respective capacities of the first storage area and the second storage area.

In this technical solution, users or manufacturers may set up different storage areas in SIM cards and the capacity of each storage area according to personal requirements; thus, different requirements of different users or different manufacturers are met and the user experience is improved.

The technical solution of the present invention will be described in detail below with an example of a dual-system terminal.

A dual-system based terminal has two systems: an Android system (equivalent to the non-designated operating system) and a security operating system (equivalent to the designated operating system). Both systems can store contacts in a card and short messages in the card. When a user operates a subscriber identity module (SIM) card in the Android system, information saved in the card defaults to public information which may also be accessed and modified on other mobile phones.

When the user has a need for security storage, the user switches to the security system where operations in the card will be saved as security information. The saved information is visible only to the security system.

Figure 3:
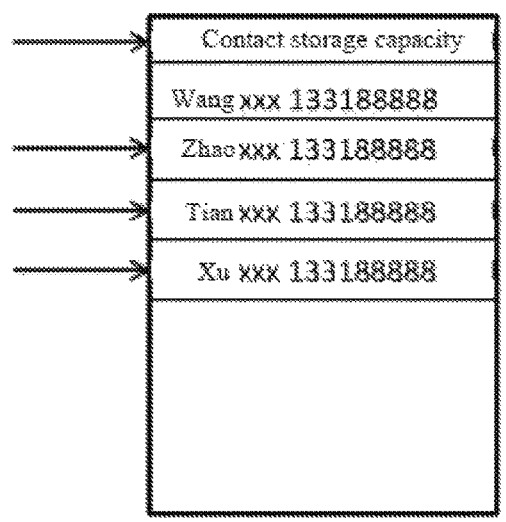
FIG. 3 shows a schematic diagram of data information of an SIM card according to one embodiment of the present invention.

The SIM used by the user of the terminal has corresponding storage spaces. For normal reading and writing of contacts or short messages in the card, the number of contacts in the card is read from the card first, and then specific contents of corresponding contacts are read from the respective storage spaces in order. As shown in FIG. 3, when the user carries out an operation on contacts in the general Android system, the terminal follows a normal operation process, i.e., firstly reading an area for saving the capacity of contacts in the memory of the card, and traversing the storage spaces according to the capacity after reading to read and display contacts.

After the user switches to the security system, the terminal operates in a security storage mode.

Figure 4:
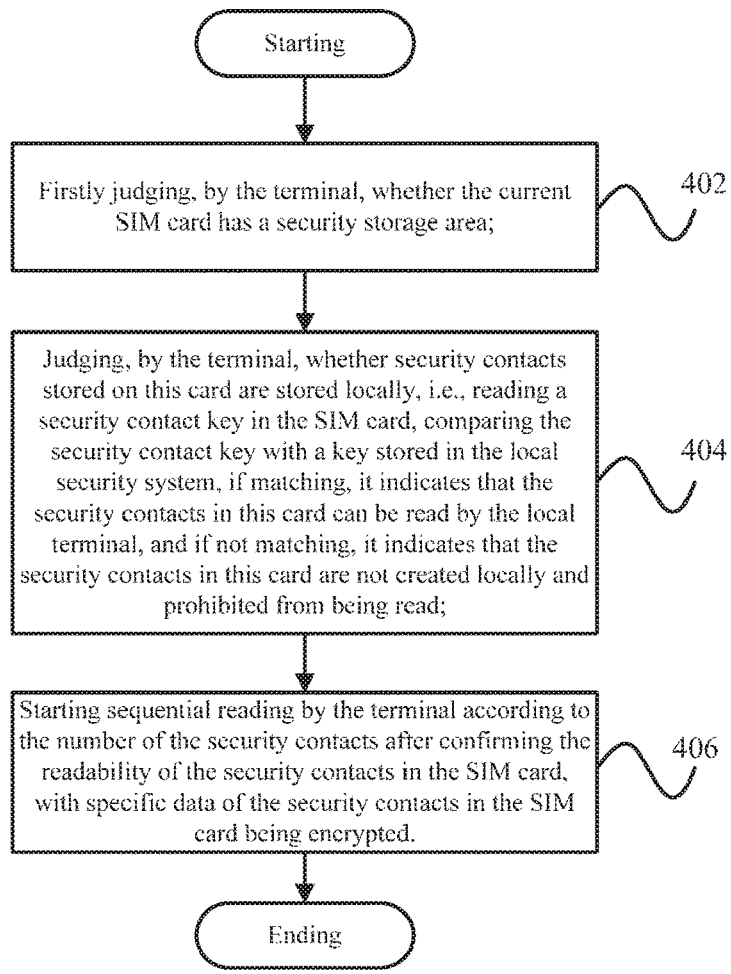
FIG. 4 shows a specific flow diagram of a data processing method according to one embodiment of the present invention.

As shown in FIG. 4, a security process for contact reading/writing is as follows:
step 402, firstly judging, by the terminal, whether the current SIM card has a security storage area, i.e., reading the rearmost end of the storage spaces of the card, if finding it non-empty, namely non-0xFFFF, it indicates that the security storage area has already been initialized in this card;
step 404, judging, by the terminal, whether security contacts stored in this card are stored locally, i.e., reading a security contact key in the SIM card, comparing the security contact key with a key stored in the local security system, if matching, it indicates that the security contacts in this card can be read by the local terminal, and if not matching, it indicates that the security contacts in this card are not created locally and prohibited from being read; and
step 406, starting sequential reading by the terminal according to the number of the security contacts after confirming the readability of the security contacts in the SIM card, with specific data of the security contacts on the SIM card being encrypted. The terminal executes decryption by using the keys stored in the SIM card and the terminal, and displays the contacts in the security system.

Figure 5:
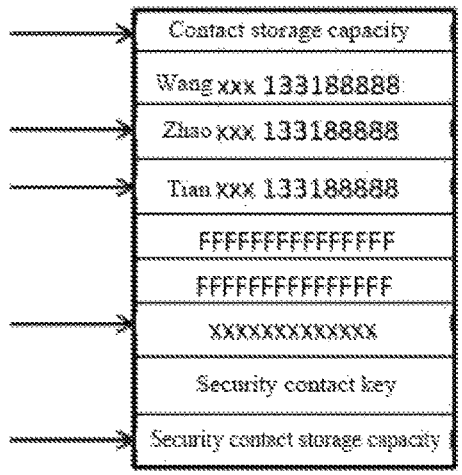
FIG. 5 shows a schematic diagram of data information of an SIM card according to another embodiment of the present invention.

As shown in FIG. 5, when storing contacts, correspondingly, for security contact storage, a corresponding newly-created security contact capacity is written in the bottom of the storage spaces of the SIM card if the number of security contacts in the SIM card is null; meanwhile, a set of keys are generated according to the unique identification, such as IMEI, of the terminal, and the keys are stored in the security system of the mobile phone and a security contact key storage area of the SIM card. Moreover, the security system encrypts security contacts input by a user before storing them in the corresponding security storage area of the SIM card.

Thus, it ensures that ordinary contacts on the SIM card can be read normally on any terminal, but the security contacts in the SIM card can only be read by the security system specified by the user. Furthermore, the storage data of the security contact is encrypted, thus ensuring the security.

Figure 6:
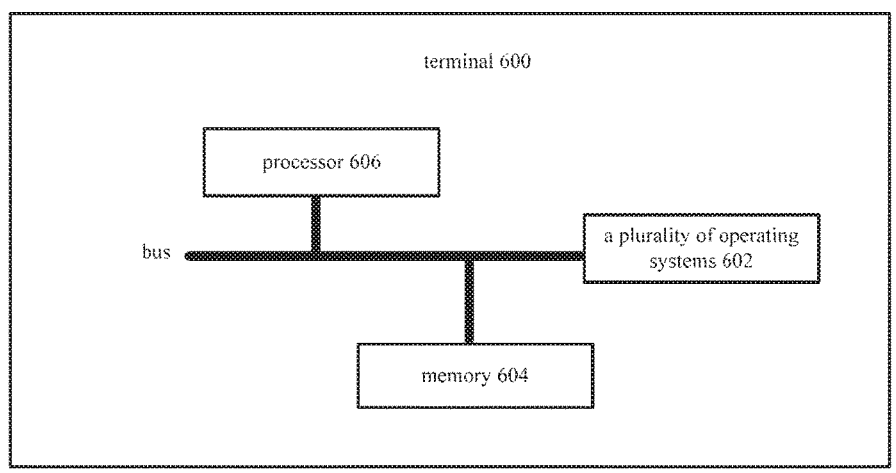
FIG. 6 shows a block diagram of a terminal according to an embodiment of the present invention.

FIG. 6 shows a block diagram of a terminal according to an embodiment of the present invention.

As shown in FIG. 6, the terminal 600 according to the embodiment of the present invention includes: a plurality of operating systems 602, a memory 604 and a processor 606 (wherein, one or more processors can be arranged in the terminal 600, and one processor 606 is taken as an example in FIG. 6). In some embodiments of the present invention, the plurality of operating systems 602, the memory 604 the processor 606 can be connected by buses or in other manners, and bus connection is taken as an example in FIG. 6.

By invoking operation instructions stored in the memory 604, the processor 606 is used for executing the following operations: determining a first operating system currently used by the terminal when a command to store data in a Subscriber Identity Module (SIM) card in the terminal is received; storing the data in a first storage area of the SIM card when the first operating system currently in use is a designated operating system amongst the plurality of operating systems of the terminal, and storing the data in a second storage area of the SIM card when the first operating system currently in use is a non-designated operating system amongst the plurality of operating systems of the terminal.

In this technical solution, the specific storage location of the data stored in the SIM card may be determined in the SIM card according to the operating system currently used by the terminal. For instance, when the operating system is the designated operating system, the data is stored in one storage area of the SIM card; when the operating system is the non-designated operating system, the data is stored in another storage area. Specifically, the storage area may be designated as the operating system having the highest security level in the terminal, or may be a certain operating system designated by a user, for instance, a security system in an existing dual-system terminal. For example, when the terminal operates with a general system, the data required to be stored is stored in a general storage area of the SIM card as general information; when the terminal operates with the security system, the data required to be stored is stored in a security storage area of the SIM card as security information. In this way, security classification is made for the data in the SIM card to distinguish the general information from the security information, so that the security of the data can be guaranteed and privacy information of users can be protected.

In the above technical solution, preferably, by invoking the operation instructions stored in the memory 604, the processor 602 is further used for executing the following operations: judging whether the first storage area exists in the SIM card when the first operating system currently in use is the designated operating system; and creating the first storage area in the SIM card when the first storage area does not exist in the SIM card.

In this technical solution, if the first storage area already exists in the SIM card, the data stored when the designated operating system is determined may be directly stored in the first storage area. However, when no first storage area exists in the SIM card, the first storage area needs to be created according to preset parameters for the first storage area, wherein the data of the first storage area includes parameters such as the capacity of the storage area and the like.

In the above technical solution, preferably, by invoking the operation instructions stored in the memory 604, the processor 606 is further used for executing the following operations: when storing the data in the first storage area of the SIM card, generating keys according to identification information of the terminal and storing the keys in the designated operating system and the first storage area of the SIM card, respectively.

In the above technical solution, preferably, by invoking the operation instructions stored in the memory 604, the processor 606 is further used for executing the following operations: determining a second operating system currently used by the terminal when a read command to the SIM card is received; allowing only the second operating system currently in use to read second data in the second storage area of the SIM card when the second operating system currently in use is the non-designated operating system; detecting whether the first storage area exists in the SIM card when the second operating system currently in use is the designated operating system; judging whether the key stored in the second operating system currently in use matches with the key stored in the first storage area when the judgment result is that the first storage area exists in the SIM card; allowing the second operating system currently in use to read first data in the first storage area when the judgment result is matching; otherwise, not allowing the second operating system currently in use to read the first data in the first storage area.

When the data is stored in the first storage area, the keys are generated according to the identification information of the terminal, for example, such information as International Mobile Equipment Identity (IMEI), International Mobile Subscriber Identification (IMSI), and Mobile Equipment Identifier (MEID), and then stored in the designated operating system of the terminal and the first storage area of the SIM card, respectively. Thus, when any terminal intends to read the data in the first storage area of the SIM card, the terminal is required to match the key stored in itself with the key stored in the SIM card; if the two match with each other, the terminal is allowed to read the data in the first storage area; and if not, it is only allowed to read the data in the second storage area. In this way, if a user stores data in the first storage area of the SIM card by using the designated operating system of the user's own terminal, other operating systems of the terminal and the operating systems of other terminals all cannot read the contents in the first storage area of the SIM card. As a result, information security of the user is guaranteed and the user experience is improved.

In the above technical solution, preferably, by invoking the operation instructions stored in the memory 604, the processor 606 is further used for executing the following operations: encrypting the first data in the first storage area by using the key generated by the designated operating system; and decrypting the first data in the first storage area by using the key stored in the first storage area when the judgment result is matching.

In this technical solution, the stored data may also be encrypted in order to further guarantee the security of the data. In this way, when terminals intend to read the stored data, only the operating systems of those terminals capable of decryption can read the data. Therefore, the security of the data is further guaranteed.

In the above technical solution, preferably, by invoking the operation instructions stored in the memory 604, the processor 606 is further used for executing the following operations: setting up in the SIM card according to a received setup command the first storage area and the second storage area as well as respective capacities of the first storage area and the second storage area.

In this technical solution, users or manufacturers may set up different storage areas in SIM cards and the capacity of each storage area according to personal requirements; thus, different requirements of different users or different manufacturers are met and the user experience is improved.

The technical solution of the present invention is described in detail above in conjunction with the accompanying drawings. By means of the technical solution of the present invention, a user can set up a security storage area of the SIM card according to personal requirements, such that other operating systems and other terminals cannot access the security data in the security storage area; thus, privacy information of the user is protected and the user experience is improved.

The foregoing descriptions are preferred embodiments of the present invention and not intended for limiting the present invention. For those skilled in the art, various changes and variations may be made for the present invention. Any modification, equivalent replacement, improvement or the like made within the spirit and principles of the present invention should fall into the protection scope of the present invention.

The invention claimed is:

1. A data processing method, used for a terminal which comprises a plurality of operating systems, and comprising:
   determining a first operating system currently used by the terminal when a command to store data in a Subscriber Identity Module (SIM) card in the terminal is received;
   storing the data in a first storage area of the SIM card when the first operating system currently in use is a designated operating system amongst the plurality of operating systems of the terminal, and storing the data in a second storage area of the SIM card when the first operating system currently in use is a non-designated operating system amongst the plurality of operating systems of the terminal; and
   when storing the data in the first storage area of the SIM card, generating keys according to identification information of the terminal and storing the keys in the designated operating system and the first storage area of the SIM card, respectively.

2. The data processing method according to claim 1, also comprising:
   judging whether the first storage area exists in the SIM card when the first operating system currently in use is the designated operating system; and
   creating the first storage area in the SIM card when the first storage area does not exist in the SIM card.

3. The data processing method according to claim 1, also comprising:
   determining a second operating system currently used by the terminal when a read command to the SIM card is received;
   allowing only the second operating system currently in use to read second data in the second storage area of the SIM card when the second operating system currently in use is the non-designated operating system;
   detecting whether the first storage area exists in the SIM card when the second operating system currently in use is the designated operating system;
   judging whether the key stored in the second operating system currently in use matches with the key stored in the first storage area when the judgment result is that the first storage area exists in the SIM card;
   allowing the second operating system currently in use to read first data in the first storage area when the judgment result is matching; otherwise, not allowing the second operating system currently in use to read the first data in the first storage area.

4. The data processing method according to claim 3, also comprising:
   encrypting the first data in the first storage area by using the key generated by the designated operating system; and
   decrypting the first data in the first storage area by using the key stored in the first storage area when the judgment result is matching.

5. The data processing method according to claim 1, also comprising:
   setting up in the SIM card according to a received setup command the first storage area and the second storage area as well as respective capacities of the first storage area and the second storage area.

6. The data processing method according to claim 2, also comprising:
   setting up in the SIM card according to a received setup command the first storage area and the second storage area as well as respective capacities of the first storage area and the second storage area.

7. The data processing method according to claim 1, also comprising:
   setting up in the SIM card according to a received setup command the first storage area and the second storage area as well as respective capacities of the first storage area and the second storage area.

8. The data processing method according to claim 3, also comprising:
   setting up in the SIM card according to a received setup command the first storage area and the second storage area as well as respective capacities of the first storage area and the second storage area.

9. The data processing method according to claim 4, also comprising:
   setting up in the SIM card according to a received setup command the first storage area and the second storage area as well as respective capacities of the first storage area and the second storage area.

10. A terminal comprising a plurality of operating systems, a memory and a processor, wherein by invoking operation instructions stored in the memory, the processor is used for executing the following operations:
    determining a first operating system currently used by the terminal when a command to store data in a Subscriber Identity Module (SIM) card in the terminal is received;
    storing the data in a first storage area of the SIM card when the first operating system currently in use is a designated operating system amongst the plurality of operating systems of the terminal, and storing the data in a second storage area of the SIM card when the first operating system currently in use is a non-designated operating system amongst the plurality of operating systems of the terminal; and
    when storing the data in the first storage area of the SIM card, generating keys according to identification information of the terminal and storing the keys in the designated operating system and the first storage area of the SIM card, respectively.

11. The terminal according to claim 10, wherein by invoking the operation instructions stored in the memory, the processor is further used for executing the following operations:
    judging whether the first storage area exists in the SIM card when the first operating system currently in use is the designated operating system; and
    creating the first storage area in the SIM card when the first storage area does not exist in the SIM card.

12. The terminal according to claim 10, wherein by invoking the operation instructions stored in the memory, the processor is further used for executing the following operations:
    determining a second operating system currently used by the terminal when a read command to the SIM card is received;
    allowing only the second operating system currently in use to read second data in the second storage area of the SIM card when the second operating system currently in use is the non-designated operating system;
    detecting whether the first storage area exists in the SIM card when the second operating system currently in use is the designated operating system;
    judging whether the key stored in the second operating system currently in use matches with the key stored in the first storage area when the judgement result is that the first storage area exists in the SIM card;
    allowing the second operating system currently in use to read first data in the first storage area when the judgment result is matching; otherwise, not allowing the second operating system currently in use to read the first data in the first storage area.

13. The terminal according to claim 12, wherein by invoking the operation instructions stored in the memory, the processor is further used for executing the following operations:
    encrypting the first data in the first storage area by using the key generated by the designated operating system; and
    decrypting the first data in the first storage area by using the key stored in the first storage area when the judgment result is matching.

14. The terminal according to claim 10, wherein by invoking the operation instructions stored in the memory, the processor is further used for executing the following operations:
    setting up in the SIM card according to a received setup command the first storage area and the second storage area as well as respective capacities of the first storage area and the second storage area.

15. The terminal according to claim 11, wherein by invoking the operation instructions stored in the memory, the processor is further used for executing the following operations:

setting up in the SIM card according to a received setup command the first storage area and the second storage area as well as respective capacities of the first storage area and the second storage area.

16. The terminal according to claim 10, wherein by invoking the operation instructions stored in the memory, the processor is further used for executing the following operations:

setting up in the SIM card according to a received setup command the first storage area and the second storage area as well as respective capacities of the first storage area and the second storage area.

17. The terminal according to claim 12, wherein by invoking the operation instructions stored in the memory, the processor is further used for executing the following operations:

setting up in the SIM card according to a received setup command the first storage area and the second storage area as well as respective capacities of the first storage area and the second storage area.

18. The terminal according to claim 13, wherein by invoking the operation instructions stored in the memory, the processor is further used for executing the following operations:

setting up in the SIM card according to a received setup command the first storage area and the second storage area as well as respective capacities of the first storage area and the second storage area.

* * * * *